Figure 1:
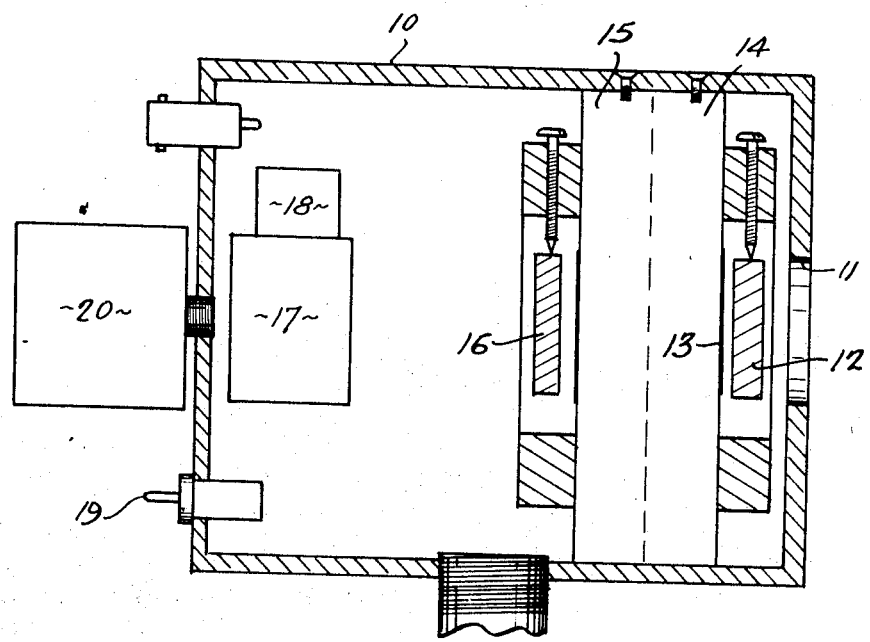

United States Patent
Lachambre

[15] 3,660,661
[45] May 2, 1972

[54] BALLISTIC JOULE METER FOR MEASURING A PULSE OF INFRARED RADIATION

[72] Inventor: Jean L. Lachambre, Charlesbourg, Quebec, Canada

[73] Assignee: Her Majesty the Queen in right of Canada as represented by the Minister of National Defence of Her Majesty's Canadian Government

[22] Filed: Aug. 20, 1970

[21] Appl. No.: 65,590

[30] Foreign Application Priority Data

Aug. 29, 1969 Canada..................................060,797

[52] U.S. Cl. .....................250/83.3 H, 73/355 R, 338/22 R
[51] Int. Cl. .............................................................G01k 3/00
[58] Field of Search............................250/83.3 H; 338/22 R; 73/355 R

[56] References Cited

UNITED STATES PATENTS 3,387,134  6/1968  Treharne ..........................250/83.3 H
3,533,858  10/1970  Seibel et al. .....................338/22 R X

FOREIGN PATENTS OR APPLICATIONS 913,175  12/1962  Great Britain ...................250/83.3 H Primary Examiner—Morton J. Frome
Attorney—Cushman, Darby & Cushman

[57] ABSTRACT

There is disclosed a ballistic joule meter containing an absorber having a sufficiently low absorption factor that energy is transmitted beyond the face of the absorber and is absorbed throughout the volume thereof. The temperature rise due to the absorption of the pulse of radiation is measured by a thin wire electrical resistance thermometer. In order to cancel out ambient effects a reference absorber is also provided in the apparatus which is not exposed to the incident radiation and the energy is measured by measuring the temperature difference between the reference and operative absorber the temperature difference being measured with a bridge circuit.

2 Claims, 3 Drawing Figures

PATENTED MAY 2 1972

3,660,661

BALLISTIC JOULE METER FOR MEASURING A PULSE OF INFRARED RADIATION

The present invention relates to a device for measuring the energy of an incident beam of radiation and in particular for measuring radiation emitted by a carbon dioxide laser at a wavelength of approximately 10.6 microns.

In many applications it is desirable to be able to give an absolute calibration to the measurement of the energy contained in a pulse of radiation emitted by a radiation source. The present invention provides a ballistic joule meter capable of accurately measuring the amount of energy in a pulse of incident radiation. At long wavelengths the usual cone devices fail because of excessive reflection and air breakdown. The apparatus of the present invention relies on the absorption of the incident radiation in a volume of a suitable absorber, thus raising the temperature of the absorber. This temperature change is detected by the change in electrical resistance of a thin wire detecting element in intimate contact with the absorber. A large volume absorption is experienced which will not cause an excessive temperature rise in any part of the absorber when a very short, very intense pulse hits it. The material selected for absorbing the incident radiation should be capable of withstanding the radiation without chemical reaction and should have sufficient depth in the direction of the radiation to absorb all the incident radiation without transmission or re-radiation. A substance particularly suitable for this purpose when a measurement at a wavelength of 10.6 microns in the infrared range are being made is calcium fluoride, $CaF_2$.

Figure 2:
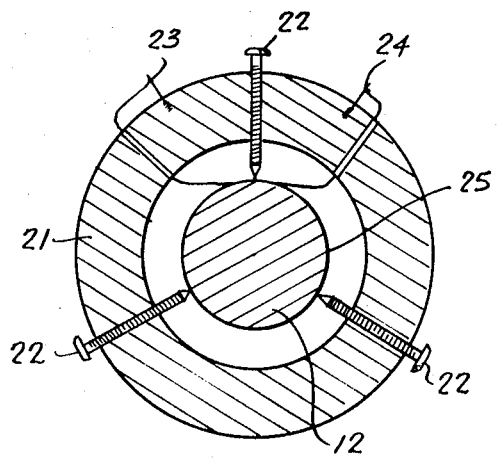
Figure 3:
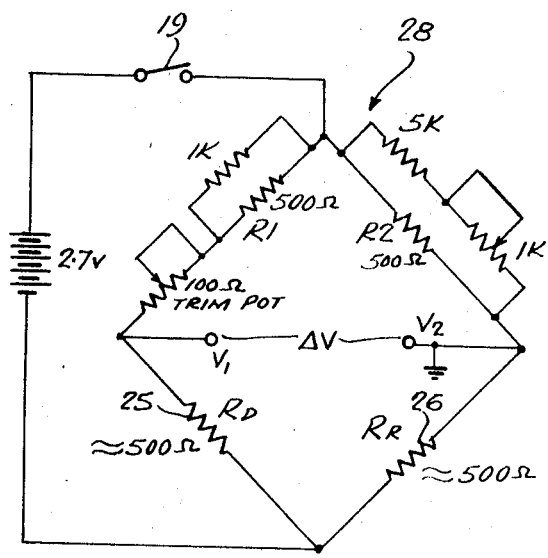

In drawings which illustrate the construction and operation of an embodiment of the present invention, FIG. 1 is a longitudinal section through a ballistic joule meter of the present invention, FIG. 2 is an end elevation of the absorber mounting structure and, FIG. 3 is an electrical schematic diagram of the measuring bridge in which the reference and detecting elements are connected for measurement of the incident radiation.

Referring to FIG. 1 there is shown a ballistic joule meter consisting of a housing 10 having an opening 11 in one end, behind which a suitable absorber 12 described in more detail below is positioned. A mirror 13 is situated behind the absorber 12 for reasons which will become apparent in due course. The mirror 13 is fastened to a plastic block 14 secured to the casing 10. A similar plastic block 15 provides a mount for a reference absorber 16 which is positioned within the enclosure 10 in a position where it cannot be irradiated by radiation incident on the absorber 12. An electrical bridge circuit 17 energized by a battery 18 and including a switch 19 and a potentiometer 20 is mounted in the end of the enclosure 10 remote from the opening 11.

As illustrated in FIG. 2 the absorber 12 is centered in a plastic mounting ring 21 by 3 screws formed of insulating material such as Teflon (Trade Mark). A detecting wire formed of 90 percent platinum and 10 percent rhodium is wrapped in 3 turns around the periphery of the absorber 12 and is connected to terminals 23 and 24 which are connected to the bridge circuit. In the embodiment illustrated in FIGS. 1 and 2 the absorber is formed of calcium fluoride and is 5 mm in thickness in the direction of the radiation. The mirror 13 reflects radiation which passes completely through the absorber which radiation re-enters the absorber and is substantially all absorbed before the radiation reaches the outer face of the absorber 12. The energy absorbed by the absorber 12 causes an increase in the temperature of the absorber which increase changes the electrical resistance of the thin wire detecting element 25.

FIG. 3 illustrates the measuring bridge circuit 28 of the present invention in which the detecting element 25 and a like resistance element 26 wrapped around the reference absorber 16 are connected in the two lower arms of the bridge circuit 28 to determine the temperature increase of the absorber due to the impinging radiation.

In operation the absorber 12 and the reference absorber 16 are allowed to equalize their temperatures for a period of time, and the bridge of Figure 3 is balanced with the temperatures of the absorbers 12 and 16 equal by obtaining a null between the terminals VI and V2 of the bridge by adjusting the variable resistances in the upper arms of the bridge. A pulse of radiation whose energy is to be measured is allowed to impinge on the absorber 12.

The thin wire detecting element 25 becomes heated by the absorber 12 and its electrical resistance changes. The bridge circuit is then unbalanced and the amount of adjustment required to rebalance the bridge is proportional to the energy impinging on the absorber 12. That is, by measuring the temperature rise of the absorber 12 and by knowing its specific heat and mass the total energy impinging on the absorber 12 can accurately be determined.

It should be noted that the ballistic joule meter of the present invention is capable of highly precise energy measurements. The cycling time for the ballistic joule meter is approximately 15 minutes; that is, it is capable of a subsequent measurement approximately 15 minutes after a previous measurement has been made. The rise time of the embodiment illustrated in FIGS. 1 and 2 is approximately 8 seconds. It will be appreciated that a very compact and precise energy measuring device is provided by the structure of the present invention.

The embodiments of the invention in which an exclusive property or privilege is claimed are defined as follows:

1. Apparatus for measuring the energy of a pulse of infra red radiation comprising an absorber of calcium fluoride adapted to internally absorb substantially all of the energy of an incident pulse of infra red radiation, a mirror reflective to infra red radiation positioned behind said absorber, said absorber having a sufficiently low absorption factor that energy is transmitted into and absorbed throughout the volume of the absorber, and means including a reference absorber, a temperature responsive electric resistance element coupled to each absorber, and an electrical bridge circuit to detect changes in resistance of a resistance element and hence in temperature of said first absorber for measuring the temperature rise of the absorber due to absorption of infra red radiant energy, said temperature rise being proportional to the energy of the incident infra red pulse.

2. A ballistic joule meter for measuring 10.6 microns pulse energy comprising a first 5 mm thick clacium fluoride absorber, an infra red reflector positioned behind said first absorber, a first detecting wire of 90 percent platinum and 10 percent rhodium wrapped around said first absorber, said first absorber being exposed to the incident beam, a second reference absorber having a second like detecting wire wrapped thereabout, a bridge circuit having said first wire and said second wire connected in adjacent arms thereof, said bridge circuit being adjustable to obtain a null balance, the amount of readjustment of the bridge after impingement of an incident beam on the absorber being a measure of the energy absorbed by said absorber.

* * * * *